US010715837B2

(12) United States Patent
Gardner

(10) Patent No.: US 10,715,837 B2
(45) Date of Patent: Jul. 14, 2020

(54) DETERMINATION OF A SERVICE OFFICE OF A MEDIA CONTENT DISTRIBUTION SYSTEM TO RECORD A MEDIA CONTENT ITEM WITH A NETWORK RECORDER

(71) Applicant: AT&T INTELLECTUAL PROPERTY I, L.P., Atlanta, GA (US)

(72) Inventor: James A. Gardner, Middletown, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 119 days.

(21) Appl. No.: 14/657,426

(22) Filed: Mar. 13, 2015

(65) Prior Publication Data

US 2016/0269688 A1   Sep. 15, 2016

(51) Int. Cl.

| | |
|---|---|
| *H04N 21/231* | (2011.01) |
| *H04N 21/472* | (2011.01) |
| *H04N 21/218* | (2011.01) |
| *H04N 21/239* | (2011.01) |
| *H04N 21/266* | (2011.01) |
| *H04N 21/2747* | (2011.01) |
| *H04N 21/258* | (2011.01) |
| *H04N 21/262* | (2011.01) |
| *H04N 21/2543* | (2011.01) |

(52) U.S. Cl.
CPC ..... *H04N 21/231* (2013.01); *H04N 21/21815* (2013.01); *H04N 21/2396* (2013.01); *H04N 21/23116* (2013.01); *H04N 21/25435* (2013.01); *H04N 21/25866* (2013.01); *H04N 21/266* (2013.01); *H04N 21/26225* (2013.01); *H04N 21/2747* (2013.01); *H04N 21/47202* (2013.01)

(58) Field of Classification Search
CPC .................................. H04N 21/2552
USPC .................................... 725/74–104
See application file for complete search history.

(56) References Cited

U.S. PATENT DOCUMENTS

| | | | |
|---|---|---|---|
| 5,898,456 A | * | 4/1999 | Wahl ............... H04N 7/17318 348/E7.071 |
| 7,003,791 B2 | | 2/2006 | Mitzutani |
| 7,024,466 B2 | * | 4/2006 | Outten ................ G06F 21/10 709/203 |

(Continued)

FOREIGN PATENT DOCUMENTS

| | | |
|---|---|---|
| CA | 2321462 | 3/2002 |
| CA | 2588642 | 5/2006 |

OTHER PUBLICATIONS

Bell, et al., "A Call for the Home Media Network", Communications of the ACM, Jul. 2002, vol. 45, No. 7, pp. 71-75.

(Continued)

*Primary Examiner* — Mushfikh I Alam
(74) *Attorney, Agent, or Firm* — Guntin & Gust, PLC

(57) ABSTRACT

A method includes receiving, at a network device of a media content distribution system, data indicating a media content item to be recorded and a number of requests to record the media content item received at a first service office of the media content distribution system. The method also includes scheduling, via the network device, recording of the media content item at a first network recorder associated with the first service office when a value associated with recording the media content item with the first network recorder is less than or equal to a cost threshold.

20 Claims, 7 Drawing Sheets

(56) References Cited

U.S. PATENT DOCUMENTS

| | | | | |
|---|---|---|---|---|
| 7,168,086 | B1* | 1/2007 | Carpenter | H04N 7/17336 348/E7.073 |
| 7,457,520 | B2 | 11/2008 | Rossetti et al. | |
| 8,161,172 | B2 | 4/2012 | Reisman | |
| 8,166,510 | B1* | 4/2012 | Ducharme | H04N 21/23103 725/104 |
| 8,195,025 | B2 | 6/2012 | Branam et al. | |
| 8,261,315 | B2 | 9/2012 | Barton | |
| 8,285,818 | B2* | 10/2012 | Grannan | H04N 5/782 709/217 |
| 8,286,208 | B2* | 10/2012 | Pasko | H04N 7/17318 386/238 |
| 8,291,484 | B2 | 10/2012 | Hagens et al. | |
| 8,332,885 | B2 | 12/2012 | Williamson et al. | |
| 8,332,902 | B2* | 12/2012 | Gong | H04N 7/17318 709/219 |
| 8,438,243 | B2 | 5/2013 | Lajoie et al. | |
| 8,474,003 | B2 | 6/2013 | Chen et al. | |
| 8,561,116 | B2* | 10/2013 | Hasek | H04L 67/2823 725/92 |
| 8,639,085 | B2 | 1/2014 | Pejaver | |
| 8,687,949 | B2 | 4/2014 | Walters et al. | |
| 8,705,944 | B2 | 4/2014 | Scholl et al. | |
| 8,789,128 | B2 | 7/2014 | Chen et al. | |
| 8,856,373 | B2* | 10/2014 | Guo | H04L 47/745 709/231 |
| 8,938,766 | B2 | 1/2015 | Wright-Riley | |
| 10,339,203 | B2* | 7/2019 | Kanemasa | G06F 17/18 |
| 2001/0043801 | A1* | 11/2001 | Komori | H04N 21/218 386/235 |
| 2002/0049977 | A1* | 4/2002 | Miller | H04N 7/17336 725/82 |
| 2002/0059619 | A1* | 5/2002 | Lebar | H04N 7/10 725/87 |
| 2004/0003413 | A1 | 1/2004 | Boston et al. | |
| 2004/0187159 | A1* | 9/2004 | Gaydos, Jr. | H04N 7/17336 725/92 |
| 2005/0028206 | A1 | 2/2005 | Cameron et al. | |
| 2006/0005224 | A1* | 1/2006 | Dunning | H04N 21/218 725/115 |
| 2006/0117260 | A1 | 6/2006 | Sloo et al. | |
| 2007/0130585 | A1* | 6/2007 | Perret | H04N 7/17318 725/46 |
| 2007/0277201 | A1* | 11/2007 | Wong | H04N 5/44543 725/40 |
| 2010/0058401 | A1* | 3/2010 | Beyabani | H04N 7/17318 725/93 |
| 2010/0146082 | A1* | 6/2010 | Isobe | H04L 12/2861 709/219 |
| 2010/0251313 | A1* | 9/2010 | Mao | H04N 21/222 725/98 |
| 2011/0103770 | A1* | 5/2011 | Goodman | H04N 7/141 386/255 |
| 2011/0141218 | A1* | 6/2011 | Stancato | G06F 21/10 348/14.01 |
| 2012/0131629 | A1* | 5/2012 | Shrum, Jr. | H04N 21/26233 725/115 |
| 2012/0159558 | A1* | 6/2012 | Whyte | H04N 21/222 725/95 |
| 2012/0229588 | A1* | 9/2012 | Greenfield | H04N 21/25883 348/14.04 |
| 2012/0284756 | A1* | 11/2012 | Kotecha | H04L 65/4084 725/68 |
| 2012/0311648 | A1* | 12/2012 | Swildens | G06Q 40/00 725/95 |
| 2012/0317293 | A1* | 12/2012 | Gu | H04L 45/126 709/226 |
| 2012/0321278 | A1 | 12/2012 | Walker et al. | |
| 2013/0081093 | A1* | 3/2013 | Cassidy | G06F 9/505 725/82 |
| 2013/0166680 | A1* | 6/2013 | Long | H04L 67/2857 709/217 |
| 2013/0272682 | A1 | 10/2013 | Barton | |
| 2013/0276022 | A1* | 10/2013 | Tidwell | H04N 21/2547 725/34 |
| 2014/0089998 | A1* | 3/2014 | Buehl | H04N 21/23113 725/93 |
| 2014/0136325 | A1 | 5/2014 | Lewis | |
| 2014/0165116 | A1 | 6/2014 | Major et al. | |
| 2014/0282750 | A1* | 9/2014 | Civiletto | H04N 21/2747 725/74 |
| 2014/0282761 | A1 | 9/2014 | Bjordammen et al. | |
| 2014/0282762 | A1* | 9/2014 | Bjordammen | H04N 21/4667 725/92 |
| 2014/0282787 | A1* | 9/2014 | Wirick | H04N 19/40 725/115 |
| 2014/0351870 | A1* | 11/2014 | Amine | H04N 21/2665 725/92 |
| 2015/0033255 | A1* | 1/2015 | Neumann | H04N 21/25891 725/34 |
| 2015/0156556 | A1* | 6/2015 | Lemmons | H04N 21/6338 725/116 |
| 2015/0286521 | A1* | 10/2015 | Long | H04L 12/1868 714/15 |

OTHER PUBLICATIONS

Bouwman, et al., "Business Model for IPTV Service: A Dynamic Framework", May 2008, http://www.researchgate.net/publication/247610873_A_business_model_for_IPTV_service_a_dynamic_framework, pp. 1-21.

Chorianopoulos, et al., "Coping with TiVo: Opportunities of the Networked Digital Video Recorder", Telematics and Informatics, vol. 24, Issue 1, Feb. 2007, pp. 48-58.

Cranor, et al., "Design and Implementation of a Distributed Content Management System", Proceedings of the 13th International Workshop on Network and Operating Systems Support for Digital Audio and Video, ACM, 2003, pp. 4-11.

Lo, et al., "Controlling Digital TV Set-Top Box with Mobile Devices via an IP Network", IEEE Transactions on Consumer Electronics, vol. 52, No. 3, Aug. 2006, pp. 935-942.

\* cited by examiner

US 10,715,837 B2

DETERMINATION OF A SERVICE OFFICE OF A MEDIA CONTENT DISTRIBUTION SYSTEM TO RECORD A MEDIA CONTENT ITEM WITH A NETWORK RECORDER

FIELD OF THE DISCLOSURE

The present disclosure is generally related to determining a service office of a media content distribution system to record a media content item with a network recorder.

BACKGROUND

Digital video recorders (DVRs) may allow users to record media content to a memory medium to be accessed at a later time. A DVR may be located at a residence. The DVR may be a standalone device or may be a component of a media device (e.g., a set-top box device). Purchase, installation and maintenance of residentially deployed DVRs may be expensive. DVRs may only be able to record a limited number of programs simultaneously. The limited number may be based on delivery bandwidth capacity to a DVR via a network, by limitations inherent to the DVR, or both. Additionally, residentially deployed DVRs may have limited storage capacity that is relatively inconvenient to expand.

Network recorders may record media content at a service office of a service provider. Service offices associated with the media content service provider that enable subscribers to store media content using network recorders may require a considerable amount of data storage capacity and bandwidth capacity to store and deliver recorded media content.

DETAILED DESCRIPTION

Figure 1:
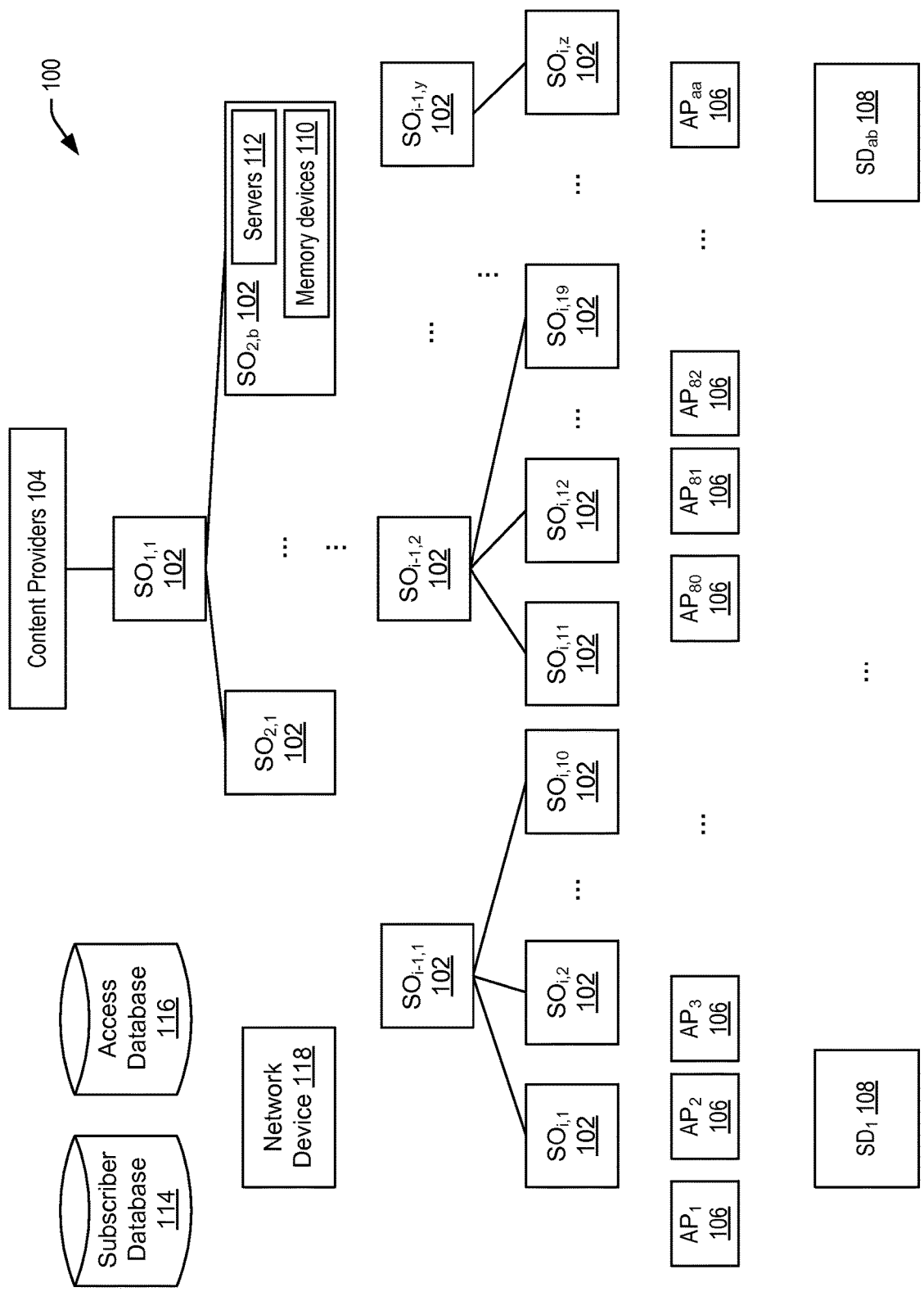
FIG. 1 is a block diagram of a media content distribution system that includes servers that generate virtual network recorders to record media content distributed via the media content distribution system.

A service provider may offer a recording service to subscribers. The recording service may enable subscribers to record media content (e.g., television programming) provided by the service provider with a network video recorder at a service office of a media content distribution system associated with the service provider. A subscriber that uses the recording service may be able to simultaneously record a number of programs. The number of programs may be defined by the service provider and may be larger than a number of programs that can be simultaneously recorded using a typical digital video recorder at a subscriber residence.

The subscriber may also access a number of recorded content items that the subscriber requested to be recorded. The number of recorded items may correspond to more items than can be stored on a typical digital video recorder at a subscriber residence. Should the subscriber reach the number of recorded items, the subscriber may delete an access right to one or more of the recorded content items to reduce the number of recorded content items associated with the subscriber, may pay for an ability to access more than the number of recorded content items, or both. The service provider may discourage long term storage of recorded media content by charging an extra amount for storage of items beyond a certain amount of time (e.g., beyond 9 months, 1 year, 2 years, or some other time). The subscriber may download recorded media content to a memory device associated with the subscriber to avoid or reduce long term storage fees.

When subscribers request recording of a media content item, a media content delivery system may determine one or more service offices to store the media content item. The one or more service offices may be selected based on storage costs and delivery costs. The one or more service offices may be selected to minimize or reduce the costs of storage and the costs of delivery to the requestors. Storage cost at a particular service office may be dependent on available storage and other factors. Delivery costs may be dependent on service office utilization and other factors.

Some recorded content may include commercial advertising. The recording service may enable subscribers to pay a fee to avoid receiving commercial advertisements during playback of recorded media content items. The payment fee may be on a per media content item basis or on a subscription basis. When a subscriber elects to not receive commercial advertising, the subscriber may be able to receive the advertising presented with the media content item for selected media content items (e.g., the Super Bowl) by changing one or more settings associated with retrieving recorded media content.

In some embodiments, the service provider may replace one or more commercial advertisements with different commercial advertising. For example, a subscriber may record a particular media content item during an election season and one or more advertisements recorded with the media content item may be political advertisements. The subscriber may view recorded content corresponding to the media content item after an election associated with the political advertisements. The service provider may replace the political advertisements with other commercial advertisements. Replacing certain commercial advertisements with replacement commercial advertisements may enable the service provider to charge advertisers fees associated with the replacement commercial advertisements. A subscriber to the recording service may be able to receive the original commercial advertising presented with the media content item by changing one or more settings associated with retrieving content.

Use of the recording service may enable the service provider to efficiently use resources for recording requested media content items and for delivery of requested recorded content to requestors. Should a service office have storage capacity issues, or should one or more network devices of the service office fail, other service offices can be used so that there is little or no disruption to subscribers.

In an illustrative embodiment, a method includes receiving, at a network device of a media content distribution system, data indicating a media content item to be recorded and a number of requests to record the media content item received at a first service office of the media content distribution system. The method also includes scheduling, via the network device, recording of the media content item at a first network recorder associated with the first service office when a value associated with recording the media content item with the first network recorder is less than or equal to a cost threshold. The value may be based on a storage cost associated with storing the media content item in a memory associated with the first service office, based on a cost of a first bandwidth delay product from a top tier of the media content distribution system to the first service office, based on a cost of a second bandwidth delay product from the first service office to subscriber devices associated with the requests, or based on combinations thereof. The cost threshold may be based on the number of requests to record the media content item received at the first service office and a cost of a third bandwidth delay product from the top tier of the media content distribution system to subscriber devices associated with the requests.

In an illustrative embodiment, a system includes a processor and a memory coupled to the processor. The memory includes instructions executable by the processor to perform operations. The operations include receiving data indicating a media content item to be recorded and a number of requests to record the media content item received at a first service office of a media content distribution system. The operations include scheduling recording of the media content item at a first network recorder associated with the first service office when a value associated with recording the media content item with the first network recorder is less than or equal to a cost threshold. The operations also include scheduling recording of the media content item at a second recorder associated with a second service office when the value associated with recording the media content item with the first network recorder is greater than the cost threshold.

In an illustrative embodiment, a computer-readable device includes instructions executable by a processor to perform operations. The operations include receiving data indicating a media content item to be recorded and a first number of requests to record the media content item received at a first service office of a media content distribution system. The operations also include scheduling recording of the media content item by a first network recorder associated with the first service office when the first number is greater than or equal to a first threshold. The first threshold may be based on a cost associated with storing the media content item to a memory associated with the first service office and based on a cost of a bandwidth delay product from a top tier of the media content distribution system to the first service office.

FIG. 1 is a block diagram that illustrates a particular embodiment of a media content distribution system 100. The media content distribution system 100 may be associated with a service provider that provides one or more services to subscribers. The services may include, but are not limited to, providing access to television programming, media-on-demand content, pay-per-view content, or combinations thereof; storing requested media content (e.g., requested television programming) via one or more network recorders; retrieving media content recorded by the one or more network recorders for subscribers that recorded the media content; receiving and sending information via the internet or other networks, enabling use of communication devices (e.g., telephones and mobile communication devices) via one or more communication networks (e.g., wired telephone networks, mobile communication networks, or both); and combinations thereof.

The media content distribution system 100 may include a plurality of service offices 102 arranged in tiers. Each tier may be associated with a geographical delivery region. (e.g., national, regional, and local) The tiers may include top tier service offices, intermediate tier service offices, and bottom tier service offices. A top tier service office, such as top tier service office $SO_{1,1}$ 102, may receive media content from one or more content providers 104. FIG. 1 depicts a single top tier service office $SO_{1,1}$ 102, but other embodiments may include more than one top tier service office. The top tier service office $SO_{1,1}$ 102 may send at least a portion of the media content received from the content providers 104 directly (i.e., without passing through another service office) to highest tier service offices of the intermediate tier service offices, such as $SO_{2,1}$ 102 through $SO_{2,b}$. In addition, the top tier service office $SO_{1,1}$ 102 may send at least a portion of the media content directly (i.e., without passing through another service office) to one or more access points for delivery to one or more subscriber devices.

Intermediate tier service offices of the media content distribution system 100, such as service offices $SO_{2,1}$ 102 through $SO_{i-1,y}$ 102, may receive media content from another service office (e.g., the top tier service office $SO_{1,1}$ 102 or an intermediate tier service office in a higher tier) and provide at least a portion of the media content to another intermediate tier service office or to a bottom tier service office, such as bottom tier service offices $SO_{i,1}$ 102 through $SO_{i,z}$ 102. The intermediate tier service offices $SO_{2,1}$ 102 through $SO_{i-1,y}$ 102 may also send at least a portion of the media content directly to one or more access points for delivery to one or more subscriber devices.

The bottom tier service offices $SO_{i,1}$ 102 through $SO_{i,z}$ 102 of the media content distribution system 100 may receive content directly from lowest tier service offices, such as service offices $SO_{i-1,1}$ 102 through $SO_{i-1,y}$ 102, of the intermediate service offices $SO_{2,1}$ 102 through $SO_{i-1,y}$ 102. The bottom tier service offices $SO_{i,1}$ 102 through $SO_{i,z}$ 102 may send at least a portion of the media content directly to access points 106, such as access points $AP_1$ 106 through $AP_{aa}$ 106 which provide media content to subscriber devices 108, such as subscriber devices $SD_1$ 108 through $SD_{ab}$ 108. The access points $AP_1$ 106 through $AP_{aa}$ 106 may be, but are not limited to, internet access points, residential gateways, customer premises equipment devices, base stations of mobile communication networks, or combinations thereof. The subscriber devices $SD_1$ 108 through $SD_{ab}$ 108 may be media devices. The media devices may include, but are not limited to, set-top box devices, game consoles, computer systems, tablet computers, laptop computers, mobile communication devices, personal digital assistants, other devices capable of receiving media content via one or more networks, or combinations thereof. The media devices may include, or may be coupled to, one or more output devices that provide output for one or more users of the media devices. The output devices may include, but are not limited to, display devices, audio devices, haptic response devices, other outputs, or combinations thereof.

Each service office 102 may include a plurality of network devices that facilitate transmission of data to desired locations. The network devices may include memory devices 110 and servers 112. The memory devices 110 may include, but are not limited to, rotating hard drives, solid state drives, other storage devices, or combinations thereof. One or more of the memory devices 110 associated with a particular service office may store media content recorded by a virtual network recorder associated with the particular service office.

At least one server of the servers 112 at each service office 102 may include instructions executable by a processor of the at least one server to generate one or more virtual network recorders. The at least one server may include one or more racks of blade servers to generate the one or more virtual network recorders. The virtual network recorders may be used to record media content items and may be used to stream recorded content corresponding to the media content items for playback by subscriber devices $SD_1$ 108 through $SD_{ab}$ 108 with access rights to the recorded content. The at least one server may be able to simultaneously operate a plurality of virtual network recorders to record media content, download recorded content to subscriber devices $SD_1$ 108 through $SD_{ab}$ 108 with access rights to the recorded content, or both. For example, the at least one server may simultaneously instantiate (e.g., generate) and operate five virtual network recorders to record five media content items and may instantiate and operate one or more additional virtual network recorders to stream one or more requested recorded content items to one or more subscriber devices 108.

The media content distribution system 100 may include a subscriber database 114. The subscriber database 114 may include data about subscribers. The data for a particular subscriber may include, but is not limited to, an account identifier of a subscriber account, a location associated with the account identifier, one or more subscriber devices of the subscriber devices $SD_1$ 108 through $SD_{ab}$ 108 associated with the account, and information about communication capabilities of the one or more subscriber devices. The location may be a customer premises. An entry for the location may be associated with an identifier of a particular service office of the service offices 102 that services the location.

The media content distribution system 100 may include an access database 116. The access database 116 may include information about recorded media content. The access database 116 may include a media content identifier of each media content item that at least one subscriber requested to be recorded. The media content identifier may be linked to media content information. The media content information may include metadata associated with the media content item. The media content information may include, but is not limited to, a name of the media content item; an episode title of the media content item when the media content is an episode of a series; a content summary of the media content item; one or more genres associated with the media content, a content rating or intended audience identifier associated with the media content, one or more actors in the media content, a director of the media content, an original air date and time; information specifying advertising locations in the media content item, advertising identifiers, and duration of advertising in the media content item; other information; or combinations thereof.

Each media content identifier of a media content item in the access database 116 may be associated with one or more identifiers of one or more service offices 102 that store the media content item. The access database 116 may include a name of a file containing the media content item, a memory location associated with the media content item, or both, for each identifier of the one or more service office that store the media content item. An identifier of a particular service office, the name of the file associated with the media content identifier, the memory location associated with the media content item, or combinations thereof may enable retrieval of recorded content corresponding to the media content item to a requesting subscriber device.

Each media content identifier of a media content item in the access database 116 may be associated with one or more account identifiers. The one or more account identifiers may identify accounts that have access rights to the media content item (i.e., identify accounts associated with requests to record the media content item via a network recorder). Entries pertaining to the media content item may be associated with the account identifier.

The entries pertaining to the media content item in the access database 116 associated with the account identifier may include, but are not limited to, a delete parameter associated with deletion of an association to the media content item identifier, a date and time of association of the media content item with the account identifier, a value that indicates whether the media content item is currently being accessed by a device associated with the account identifier, a delay time, other information, or combinations thereof.

The delete parameter may indicate that an association to the media content item can be deleted only by a user request to delete the association or upon occurrence of a particular event. The event may include, but is not limited to, a complete playback of the media content item, a substantially complete playback of the media content item (e.g., all of the media content item except a portion corresponding to end credits, advertising after program content ended, or both), passage of a particular amount of time from the date and time of association of the media content item with the account identifier (e.g., 1 month, 6 months, 9 months, 1 year, or other time period), and an addition of another episode of the program beyond a specified number of episodes when the media content item corresponds to an earliest episode of recorded episodes associated with the account identifier.

The delay time may indicate a time after the beginning of the media content item when a request to record the media content item was received. When the delay time has a non-zero value and a user requests retrieval of recorded media content corresponding to the media content item, the media content may be provided beginning at a point in the media content corresponding to the delay time. In some embodiments, the media content distribution system 100 may allow access to all of the recorded content even when a subscriber request to record the media content item was received during presentation of the media content item by the media content distribution system 100. In such embodiments, the delay value may not be used.

When an association of the media content identifier to the particular account identifier is deleted in the access database 116 (e.g., the account identifier and the entries associated with the account identifier for the media content identifier are deleted), devices associated with the particular account identifier may not be able to access recorded content corresponding to the media content item. The association of the media content identifier to the particular account identifier may be automatically deleted based on occurrence of an event (e.g., passage of a particular amount of time or recording of another episode of a series above a threshold number of episodes) or may be deleted based on a subscriber request.

When no account identifiers are associated with a particular media content identifier in the access database 116, all entries associated with the particular media content identifier may be deleted from the access database 116 since no subscribers have access rights to recorded content corresponding to a media content item identified by the particular media content identifier. Deleting all entries associated with the media content identifier may include sending a delete command with the file name and/or memory location of the file containing the media content item to each service office 102 that stores the media content item to enable one or more service offices 102 that stored the media content item to free memory associated with the media content item.

The media content distribution system 100 may include a network device 118. The network device 118 may determine which service office 102 or service offices 102 are to store requested media content items. Which service office 102 or service offices 102 are to store the media content item may be based on a storage cost of storing the media content item at a memory device 110 of a particular service office and delivery costs associated with delivering the media content item to the particular service office and to one or more subscriber devices associated with requests for the media content item via the particular service office. In alternate embodiments, each service office 102 may include a server of the servers 112 that determines whether the service office 102 is to store requested media content in a memory device of the memory devices 110 associated with the service office 102. When the determination by the server is not to record the requested media content at the service office 102, the number of requests for the requested media content may be attributed to a particular service office that directly sends media content to the service office 102.

Each of the subscriber devices $SD_1$ 108 through $SD_{ab}$ 108 may include a processor and a memory accessible to the processor. The memory may include instructions executable by the processor to use a recording service associated with the service provider. For example, a subscriber device 108 (e.g., $SD_1$ 108) may include an application or a program that enables access to services associated with the recording service for an account associated with the subscriber device 108. The account may be identified by an account identifier. When the application or program is activated, a query may be sent to the subscriber database 114 that includes an identifier of the subscriber device 108. When the identifier of the subscriber device 108 is in the subscriber database 114, the account identifier associated with the subscriber device 108 may be returned. When the subscriber device 108 is not identified in the subscriber database 114, a user of the subscriber device 108 may be required to enter account information (e.g., a user name and a password) to retrieve the account identifier from the subscriber database 114.

The services associated with the recording service may include providing a first interface that enables generation of listings of media content items that can be recorded and providing a second interface that generates listings of recorded content identified in the access database 116 that can be retrieved by the subscriber device 108 based on the account identifier associated with the subscriber device 108. The first interface may include an electronic program guide that displays media content items available via the media content distribution system 100 for the particular account (e.g., based on a service level associated the account identifier) along with scheduled times for presentation of the media content items. The electronic program guide may be coupled to a search engine that enables a user to search for particular media content items based on entered criteria (e.g., title, genre, actors, date range, time range, other criteria, or combinations thereof).

The first interface may also include storage information. The storage information may identify a number of recorded media content items and to be recorded media content items associated with the account identifier. The number of recorded media content items and the number of to be recorded media content items may be information retrieved from the access database 116. The storage information may also include a maximum number of recorded media content items associated with the account identifier. When the number of recorded media content items and to be recorded media content items associated with the account identifier reaches the maximum number of recorded media content items associated with the account identifier, additional media content items cannot be recorded via the recording service. The storage information enables a user to determine if one or more additional media content items can be recorded. When the number of recorded media content items and to be recorded media content items associated with the account identifier approaches the maximum number of recorded media content items associated with the account identifier, the user may delete associations to one or more recorded media content items, may upgrade the recording service to a level that allows for storage of more media content items, or combinations thereof.

The user of the subscriber device 108 may select a media content item to be recorded via the first interface. The user may enter one or more options associated with ending access to recorded content associated with the media content item (e.g., keep until user deleted, keep for a particular time, etc.) or the user may accept default options. When the user selects a particular media content item and enters user input of a command to record the particular media content item via the recording service, a request that includes the account identifier, a media content identifier of the particular media content item, and a delete parameter associated with deletion of access to the media content item may be sent to an access point 106 that the subscriber device 108 is utilizing. The access point 106 may send the request directly or indirectly to a service office 102 of the media content distribution system 100.

In an illustrative embodiment, a server 112 of the service office 102 that receives the request may determine whether the media content identifier is associated with a second media content identifier in a rerun table that identifies previous presentations of the media content item (i.e., the media content identifier is associated with a subsequent showing of particular media content associated with the second media content identifier. When the media content item is identified in the rerun table, the server 112 may determine if the second media content identifier is in the access database 116. When the second media content identifier is in the access database 116, the server 112 may update the access database 116 to associate the account identifier with the second media content identifier, may associate the delete parameter with the account identifier, and may enter association information associated with the account identifier that corresponds to a scheduled time for presentation of the media content item. The association information may be used to inhibit access to recorded content corresponding to the media content item by a subscriber device 108 associated with the account identifier until after the scheduled time for presentation of the media content item. The server 112 may send a notification to the network device 118, or to a different device of the media content distribution system 100, that indicates that storage locations of recorded content associated with the second media content identifier should be reexamined since at least one additional account identifier is associated with the second media content identifier. Associating the account identifier with the second media content identifier may eliminate a need to store the media content item at one or more service offices 102 since the content of the media content item would be the same as, or substantially the same as, the recorded content associated with the second media content identifier.

Alternately, or when the media content item is not included in the rerun table, the server 112 may determine if the media content identifier is in the access database 116. When the media content identifier is not in the access database 116, the server 112 may create an entry in the access database 116 for the media content identifier and send a provision request to a provisioning server to provide information or links in the access database 116 associated with the media content identifier (e.g., name, episode information, actors, director, etc.). The server 112 may also create an entry in the access database 116 that associates the account identifier with the media content identifier and associates the delete parameter with the account identifier. When the media content identifier is in the access database 116, the server 112 may access the access database 116 and create an entry that associates the account identifier with the media content identifier and an entry that associates the delete parameter with the account identifier. The association of the account identifier with the media content identifier may enable subscriber devices 108 associated with the account identifier to retrieve recorded content associated with the media content identifier.

In an embodiment, the server 112 may forward data regarding the request to the network device 118 when the network device 118 is used to determine at least one service office 102 to store the media content item. In an embodiment, the server 112 may forward data regarding the request to a particular service office associated with the account identifier when determinations of where to store the media content item are made by servers 112 of service offices 102 attributed with requests to store the media content item. At a time before a scheduled presentation time of the media content item, the media content distribution system 100 may determine one or more service offices 102 that will store the media content item via one or more network recorders (e.g., virtual network recorders generated by one or more servers 112 of the one or more service offices 102 selected to store the media content item).

The second interface presented to subscriber devices 108, which is associated with the subscriber services, may include a listing of recorded media content associated with an account identifier. An order of the listing may be user controllable (e.g., alphabetical order, by date, by genre, etc.), may be searchable by user criteria (e.g., name, data range, actor, genre, other criteria, or combinations thereof), or both. A user may select a media content item identified in the listing. The user may enter a command associated with the media content item. The command may be a playback command, a download command, a delete command, or another command.

The playback command may cause a playback request to be sent to a service office 102 in communication with the subscriber device 108. The playback request may include a media content identifier associated with the media content item, the account identifier, and one or more parameters associated with the subscriber device 108. The one or more parameters may include information about a resolution capability of the subscriber device 108. The service office 102 may determine via the access database 116 whether the account identifier has access to recorded content associated with the media content identifier. When the account identifier does not have access to the recorded content, a notification may be sent by the service office 102 to the subscriber device 108. For example, two entries for the account identifier may be associated with the media content identifier in the access database. When a first entry indicates current playback of the recorded content associated with the account identifier, when a second entry indicates current playback of the recorded content associated with the account identifier, and when a third playback request is received from the subscriber device, the service office 102 may deny the third playback request and send the notification to the subscriber device 108 with an explanation that all available copies associated with the account are currently in use.

When the service office 102 determines that the service office has access to the recorded content, the service office 102 determines whether the service office 102 stores the recorded content via a query to the access database 116. When the service office 102 stores the recorded content, the service office 102 may generate a virtual network recorder to stream the recorded content to the subscriber device 108. When the service office 102 does not store the recorded content, the service office 102 may send a play request to a locator server that determines a particular service office to generate a virtual network recorder that streams the recorded content to the subscriber device 108 via the service office 102. In an embodiment, the network device 118 may include the locator server. The particular service office may be a service office that sends content to the service office 102. When no service office that stores the recorded content sends content to the service office 102, the locator server may have a copy of the recorded content copied from a first service office that stores the recorded content to a particular service office that sends content to the service office 102. The particular service office may generate a virtual network recorder to stream the recorded content to the subscriber device via the service office and may delete the copy of the recorded content when the virtual network recorder is terminated after completion of playback to the subscriber device 108.

The subscriber device 108 may display the recorded content streamed from the media content distribution system 100 via a third interface. The virtual recorder may stream the content based on the one or more parameters. For example, the recorded content may be recorded in a high definition resolution, but the one or more parameters may indicate that a highest playback resolution associated with the subscriber device is lower than the high definition resolution. In response, the virtual network recorder may reduce the resolution of the recorded media content to a resolution appropriate for the subscriber device 108.

A user of the subscriber device 108 may enter control commands (e.g., pause, play, rewind, fast forward, stop) via the third interface, a control device, or both. The control commands may be forwarded to the virtual network recorder that streams the recorded content for execution.

The download command received via the second interface may cause a download request to be sent to the service office 102 in communication with the subscriber device 108. The download request may include the media content identifier, the account identifier, and a filename for a download file to store the recorded content. The service office 102 may determine whether to download the recorded content to the subscriber device based on entries in the access database 116. When the service office determines not to download the recorded content, the service office 102 may send a notification to the subscriber device 108. When the service office 102 determines to download the recorded content, the service office 102 determines, via the access database 116, whether the service office 102 stores the recorded content. When the service office 102 stores the recorded content, the service office 102 downloads the recorded content to the subscriber device 108 for storage in a file with the filename. When the service office 102 does not store the recorded content, the service office 102 may send a download request to the locator server. The locator server may determine a first service office that stores the recorded content and may send a command that causes the first service office to download the recorded content to the subscriber device 108 for storage in a file with the filename.

The delete command may cause a delete request to be sent to the service office 102 in communication with the subscriber device 102. The delete request may include a media content identifier associated with the media content item and an account identifier associated with the subscriber device. The service office 102 may update the access database 116 to delete the account identifier associated with the media content identifier and entries associated with the account identifier associated with the media content identifier (e.g., a delete parameter, association time data, etc.). After deletion of the account identifier associated with the media content identifier, subscriber devices 108 associated with the account identifier may not have access to recorded content associated with the media content identifier.

Figure 2:
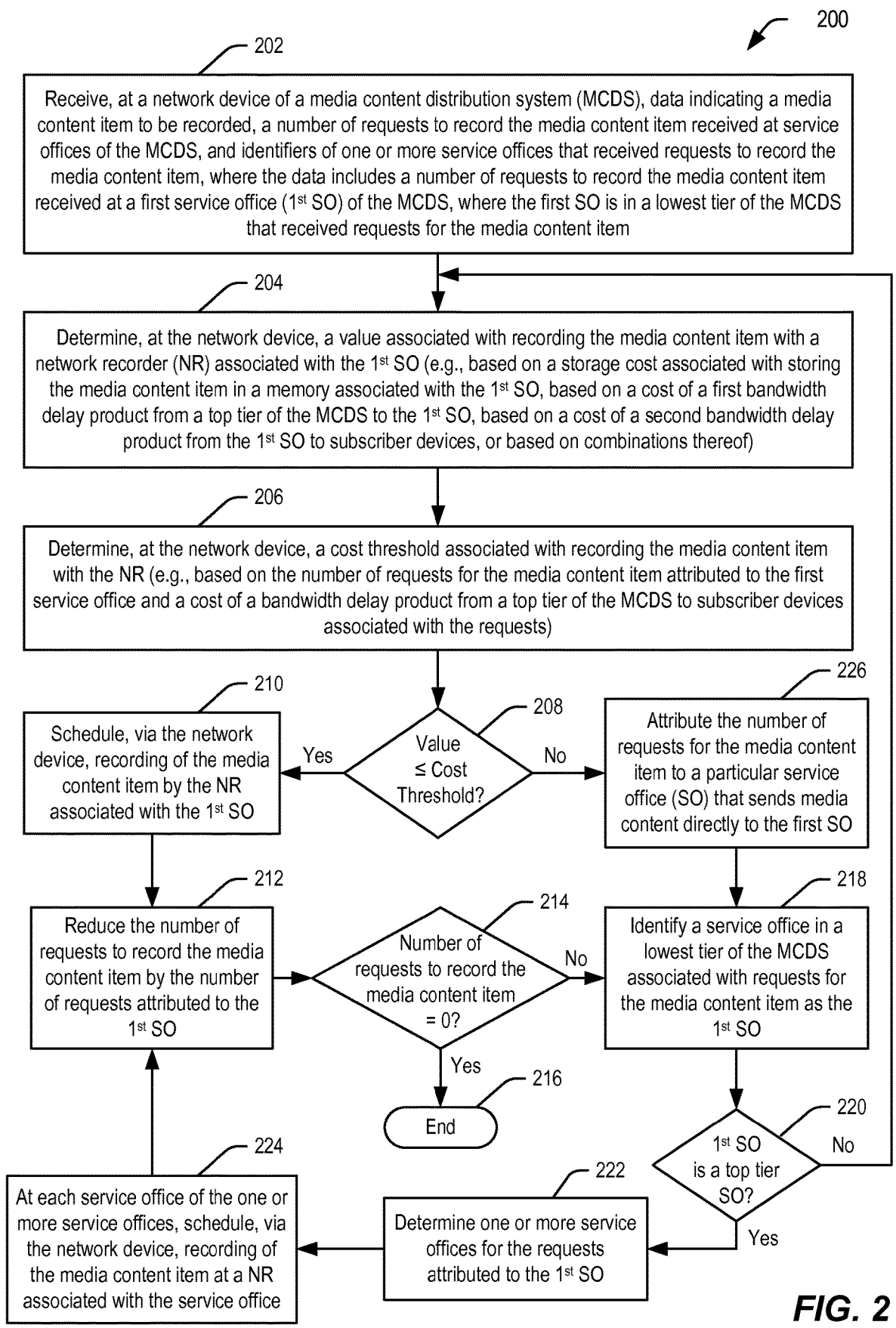
FIG. 2 is a flowchart of a first embodiment of a method to determine one or more storage locations for a media content item to be recorded by one or more network recorders of a media content distribution system.

Referring to FIG. 2, a flowchart that illustrates a first embodiment of a method 200 of determining one or more storage locations for a media content item to be recorded by one or more network recorders of a media content distribution system is shown. The method 200 may be performed by the network device 118 of the media content distribution system 100 of FIG. 1. The method 200 may include receiving at the network device of the media content distribution system, data indicating a media content item to be recorded, a number of requests to record the media content item received at service offices of the media content distribution system, and identifiers of one or more service offices that received requests to record the media content item, at 202. The data includes a number of requests to record the media content received at a first service office of the media content distribution system that is in a lowest tier of the media content distribution system that received requests for the media content item.

A request to record the media content item that is associated with a particular service office may be received at the network device from the particular service office or may be received from a different service office that associated the request with the particular service office based on an account identifier. For example, a first user may send a first request for network recording of the media content item from a media device located at a residence associated with the first user. The request may be received by a first server of the first service office. The first server may determine a first account identifier associated with the media device, may determine that the first service office is associated with the first account identifier, may determine that no previous request to record the media content item associated with the first account identifier was received, and may create associated entries in an access database that identify the media content item and the first account identifier. The first server may send data regarding the request to the network device. The data may identify the media content item and the first service office. The network device may increment a counter associated with a number of requests to record the media content item received from the first service office by one in response to the data.

If the first server determines that the first account identifier is associated with a previous request to record the media content item (e.g., an entry in the database associated with the identifier of the media content item is already associated with the first account identifier), the first server may send a notification to the media device. The notification may include information that the media content item is already scheduled to be recorded. The notification may provide a first option to associate another copy of the media content item with the account identifier and may provide a second option to cancel the record request. When an indication of selection of the first option is received (i.e., user input selecting the first option or passage of a time with no response when the first option is a default), the first server may update the access database to include another entry of the account identifier associated with the media content identifier of the media content item. The first server may send data regarding the request to the network device. The data may identify the media content item and the first service office. The network device may increment a counter associated with a number of requests to record the media content item received from the first service office by one in response to the data. When an indication of selection of the second option is received (i.e., user input selecting the second option or passage of a time with no response when the second option is a default), the request is cancelled and no data regarding the request is sent to the network server.

As another example, a second user may send a second request for network recording of the media content item from a mobile communication device. The request may be received by a second server of a second service office. The second server may determine a second account identifier associated with the mobile communication device, may determine that the first service office is associated with the account identifier, may determine that no previous request to record the media content item associated with the second account identifier was received, and may create associated entries in the access database that identify the media content item and the second account identifier. The second server may send data regarding the request to the network device. The data may identify the media content item and the first service office. The network device may increment the counter associated with a number of requests to record the media content item received from the first service office by one in response to the data.

The media content item may be scheduled to be delivered via the media content distribution system at a particular time. At a first time before the particular time sufficient to enable determination of storage locations for the media content item, the network device may determine one or more service offices to store the media content item based on storage costs associated with storing the media content item and based on delivery costs associated with delivering the media content item to devices associated with the requestors. A delivery cost associated with a particular account may be associated with delivering the media content item via a particular service office associated with the particular account. Though the storage locations of the media content item is based on a subscriber receiving recorded media content corresponding to the media content item via a particular service office, the subscriber may receive the recorded content via a different service office.

Should one or more additional requests for the media content item be received by one or more service offices after the first time and before the particular time, the one or more additional requests may be serviced by network recorders associated with service offices that received the one or more additional requests. When one or more additional requests are received after the first time and before recording of the media content item ends, a flag may be set that indicates to the media content distribution system that an event has occurred. When the flag indicates than an event has occurred, the media content distribution system may determine whether one or more storage locations for the media content item should be changed. An embodiment of a method for determining whether one or more storage locations for the media content item should be changed is described with respect to FIG. 6.

Beginning at the first time, the method 200 may include the network device determining a value associated with recording the media content item with a network recorder associated with the first service office, at 204. The value may be based on a storage cost associated with storing the media content item in a memory device associated with the first service office, based on a cost of a first bandwidth delay product from a top tier of the media content distribution system to the first service office, based on a cost of a second bandwidth delay product from the first service office to customer devices, or based on combinations thereof.

The network device may determine a cost threshold associated with recording the media content item with a network recorder associated with the first service office, at 206. The cost threshold may be based on a number of requests attributed to the first service office and a cost of a bandwidth delay product from a top tier of the media content distribution system to customer devices associated with the requests.

The network device may determine whether the value is less than or equal to the cost threshold, at 208. When the value is less than or equal to the cost threshold, the network device may schedule recording of the media content item by a network recorder associated with the first service office, at 210. The network device may update the access database with an entry that associates an identifier of the first service office with a media content identifier of the media content item. Scheduling the network recorder may include sending a request that identifies the media content item to a server associated with the first service office. At the scheduled time or at a different time if one or more previous programs went past scheduled end times, the server may initiate a virtual network recorder that stores a copy of the media content item to a memory device associated with the first service office. The virtual network recorder may update the access database with entries associated with the identifier of the first service office. The entries may identify the memory device. The entries may also identify a name of a file of the media content item at the memory device, a memory location of the media content at the memory device, or both.

The network device may reduce the number of requests to record the media content item by the number of requests attributed to the first service office, at 212. The network device may determine whether the number of requests to record the media content item is zero, at 214. When the number of requests to record the media content item is zero, the method 200 may end at 216. When the number of requests is not zero, the network device may identify a service office in a lowest tier of the media content distribution system associated with requests for the media content item as the first service office, at 218.

The network device may determine whether the first service office is a top tier service office, at 220. When the determination is that the first service office is not a top tier service office, the method 200 may then proceed to 204, where the network device determines the value associated with recording the media content item with a network recorder associated with the newly identified first service office.

When the determination is that the first service office is a top tier service office, the network device may determine one or more service offices to store the media content associated with the requests attributed to the first service office, at 222. To determine the one or more service offices, the network device may determine viable options of service office combinations to store the media content item, may determine a cost associated with each viable option, and may determine a lowest cost option. The one or more service offices may be the service offices associated with the lowest cost option. The cost for a particular option of the viable options may be a sum for each service office in the particular option of a storage cost associated with the service office, a cost of a first bandwidth delay product from the first service office to the service office, and a cost of a second bandwidth delay product from the service office to subscriber devices associated with the service office that requested the media content item.

For example, if six requests are associated with the first service office, and queries to the access database indicate that all six requests are associated with a particular service office in a bottom tier of a three tier media content distribution system, delivery costs may dominate and the determination may indicate that storing the media content at the particular service office has a lowest cost of viable options (e.g., storing the media content item at the first service office, storing the media content item at an intermediate tier service office that sends media content to the particular service office, and storing the media content item at the particular service office).

As another example, if ten requests are associated with the first service office, and queries to the access database indicate that the ten requests are associated with distinct bottom tier service offices of a three tier media content distribution system, storage costs may dominate and the determination may indicate that storing the media content at the first service office has a lowest cost of viable options (e.g., storing the media content item at the first service office, storing the media content item at service offices corresponding to intermediate tier service office that directly send media content to the ten bottom tier service offices, and storing the media content item at the ten bottom tier service offices).

At each service office of the one or more service offices, the network device may schedule recording of the media content item by a network recorder associated with the service office, at 224. For each service office of the one or more service offices, the network device may update the access database with an entry associated with the media content identifier of the media content item, where the entry includes an identifier of the service office. For each service office of the one or more service offices, scheduling a network recorder may include sending a request that identifies the media content item to a server associated with the service office. At the scheduled time or at a different time if one or more previous programs went past scheduled end times, the server may initiate a virtual network recorder that stores a copy of the media content item to a memory device associated with the first service office. The virtual network recorder may update the access database with entries associated with the identifier of the service office. The entries may identify the memory device and a name of a file of the media content item at the memory device. The method 200 may then proceed to 212, where the network device reduces the number of requests to record the media content item by the number of requests attributed to the first service office.

When the determination, at 208, is that the value is greater than the cost threshold, the network device attributes the number of requests for the media content item to a particular service office that sends media content directly to the first service office, at 226. The method 200 may then continue to 218, where the network device may identify a service office in a lowest tier of the media content distribution system associated with unaccounted for requests for the media content item as the first service office.

Thus, the method 200 of FIG. 2 enables a network device of a media content distribution system to schedule recording of the media content item by one or more network recorders associated with one or more service offices of the media content distribution system. At a scheduled time, one or more network recorders may record the media content item to memory devices of the one or more service offices. The one or more service offices may be selected to provide a balance between costs associated with storing the media content item and costs associated with delivering the media content items to particular subscriber devices.

Figure 3:
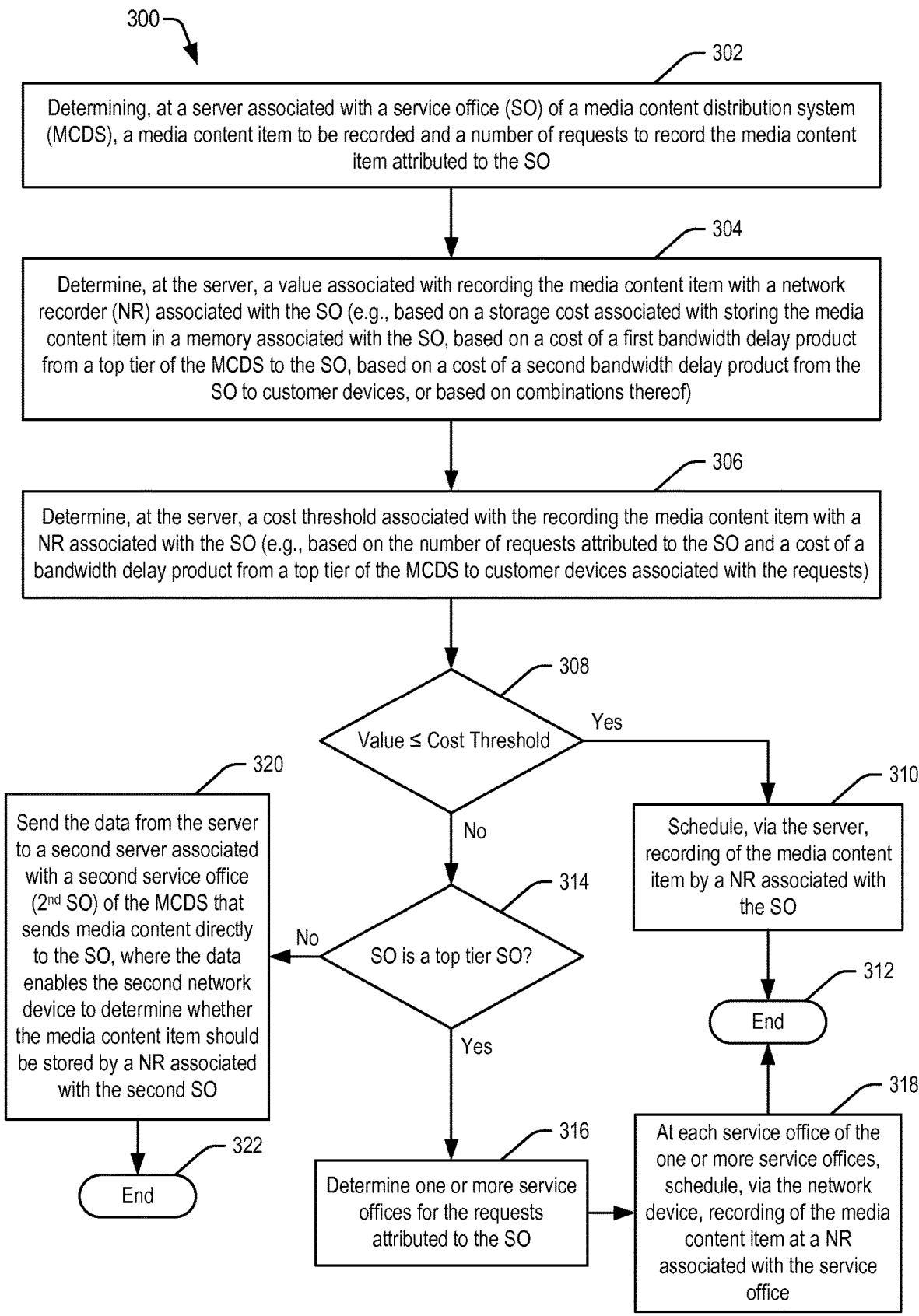
FIG. 3 is a flowchart of a second embodiment of a method to determine one or more storage locations for media content to be recorded by one or more network recorders of a media content distribution system.

Referring to FIG. 3, a flowchart that illustrates a second embodiment of a method 300 of determining one or more storage locations for a media content item to be recorded by one or more network recorders of a media content distribution system is shown. The method 300 may be performed by one or more servers associated with one or more service offices 102 of the media content distribution system 100 of FIG. 1. The media content item may be scheduled to be delivered by the media content distribution system at a particular time. At a first time before the particular time, a server of each service office attributed with one or more requests for the media content item in a lowest tier of the media content distribution system initiates the method 300. At a subsequent time that allows for completion of the method by the service offices in the lowest tier, a server of each service office attributed with one or more requests for the media content item in a tier that sends media content directly to the lowest tier performs the method 300. Similarly, the method is performed by servers in service offices attributed with one or more requests for the media content item in each higher tier of the media content distribution system. The first time is selected so that all tiers of the media content distribution system have sufficient time to perform the method 300 before the particular time is reached.

Servers associated with service offices of the media content distribution system may receive data from one or more access points associated with the service offices or from one or more other service offices. The one or more other service offices may be service offices that received requests from subscriber devices that are associated with the first service office. When a server associated with a service office receives a request to record the media content item from a subscriber device via an access point, the server may determine an account identifier associated with the subscriber device. The server may create entries in an access database that include the account identifier and a media content identifier of the media content item associated with the account identifier. The server may also determine whether the account identifier is associated with the service office associated with the server. When the account identifier is associated with the service office, the server may increment a counter for the media content item at the server by one. When the account identifier identifies a second service office associated with the account identifier, the server may send request data to a particular server associated with the second service office. The request data may identify the media content item and may indicate that a request for the media content item associated with the second service office was received. The particular server that receives the request data may increment a counter for the media content item at the particular server by one.

The method 300 may begin at the first time with a server associated with a service office determining the media content item to be recorded and a number of requests to record the media content item attributed to the service office, at 302. The server may determine a value associated with recording the media content item with a network recorder associated with the service office, at 304. The value may be based on a storage cost associated with storing the media content item in a memory associated with the service office, based on a cost of a first bandwidth delay product from a top tier of the media content distribution system to the service office, based on a cost of a second bandwidth delay product from the service office to customer devices, or based on combinations thereof. The server may also determine a cost threshold associated with recording the media content item with a network recorder associated with the service office, at 306. The cost threshold may be based on a number of requests attributed to the service office and a cost of a bandwidth delay product from a top tier of the media content distribution system to customer devices associated with the requests.

The server may determine whether the value is less than or equal to the cost threshold, at 308. When the value is less than the cost threshold, the server may schedule recording of the media content item by a network recorder associated with the service office, at 310. The server may make an entry in the access database that associates an identifier of the service office with the media content identifier. Scheduling the network recorder may include sending a request that identifies the media content item to a recorder server. At the scheduled time or at a different time if one or more previous programs went past scheduled end times, the recorder server may initiate a virtual network recorder that stores a copy of the media content item to a memory device associated with the service office. The virtual network recorder may update the access database with entries associated with the identifier of the service office. The entries may identify the memory device that stores the media content item and a name of a file of the media content item at the memory device. The method 300 for the service office ends, at 312.

When the value is greater than the threshold, at 308, the server may determine whether the service office is in a top tier of the media content distribution system, at 314. When the service office is in the top tier of the media content distribution system, the server may determine one or more service offices to store the media content associated with the requests attributed to the first service office, at 316. To determine the one or more service offices, the server may determine viable options of service office combinations to store the media content item, may determine a cost associated with each viable option, and may determine a lowest cost option. The one or more service offices may be the service offices associated with the lowest cost option. The cost for a particular option of the viable options may be a sum for each service office in the particular option of a storage cost associated with the service office, a cost of a first bandwidth delay product from the first service office to the service office, and a cost of a second bandwidth delay product from the service office to subscriber device associated with the service office that requested the media content item.

At each service office of the one or more service offices, the network device may schedule recording of the media content item by a network recorder associated with the service office, at 318. For each service office of the one or more service offices, the network device may update the access database with an entry associated with the media content identifier of the media content item, where the entry is an identifier of the service office. For each service office of the one or more service offices, scheduling a network recorder may include sending a request that identifies the media content item to a server associated with the service office. At the scheduled time or at a different time if one or more previous programs went past scheduled end times, the server may initiate a virtual network recorder that stores a copy of the media content item to a memory device associated with the service office. The virtual network recorder may update the access database with entries associated with the identifier of the service office. The entries may identify the memory device and a name of a file of the media content item at the memory device. The method 300 for the service office ends, at 312.

When the determination at 314 is that the service office is not a top tier service office, the server may send the data to a second server associated with a second service office of the media content distribution system that sends media content directly to the service office, at 320. The data may enable the second network device to determine whether the media content item should be recorded by a network recorder associated with the second service office during a subsequent iteration of the method 300 for a next higher tier. The method 300 for the service office ends, at 322.

Thus, the method 300 of FIG. 3 enables servers of service offices to determine whether the servers are to schedule recording of the media content item by network recorders associated with the service offices. At a scheduled time, one or more network recorders associated with one or more service offices may record the media content item to memory devices of the one or more service offices. The one or more service offices may be selected to provide a balance between costs associated with storing the media content item and costs associated with delivering the media content items to particular subscriber devices.

Figure 4:
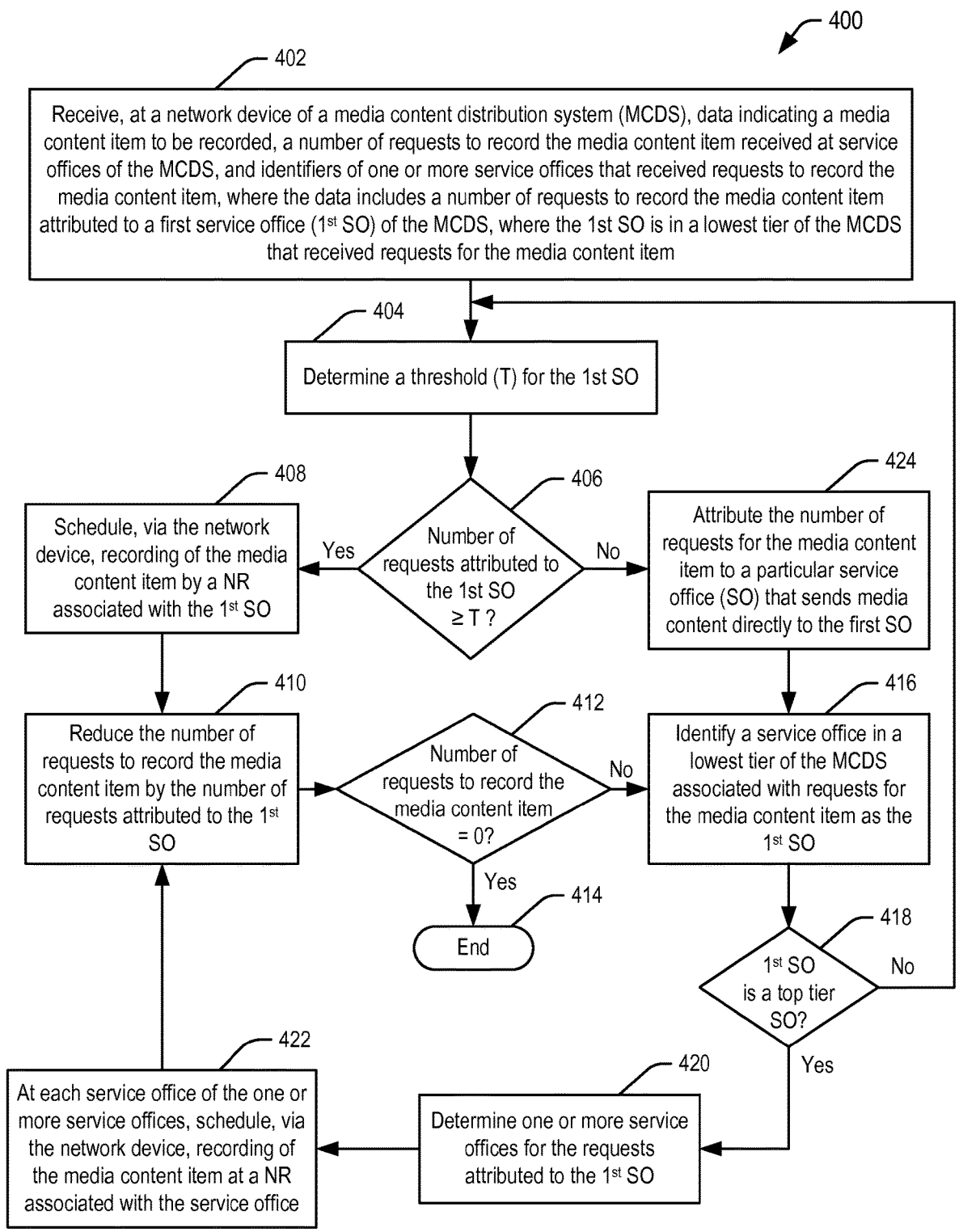
FIG. 4 is a flowchart of a third embodiment of a method to determine one or more storage locations for media content to be recorded by one or more network recorders of a media content distribution system.

Referring to FIG. 4, a flowchart of a third embodiment of a method 400 of determining one or more storage locations for a media content item to be recorded by one or more network recorders of a media content distribution system is shown. The method 400 may be performed by the network device 118 of the media content distribution system 100 of FIG. 1. One or more requests for the media content item may be received at service offices of the media content distribution system from one or more subscriber devices. When a service office receives a request for the media content item from a subscriber device, the service office may determine an account identifier associated with the subscriber device. The service office may create an entry in an access database of the account identifier associated with a media content identifier of the media content item. The entry may allow a device associated with the account identifier to retrieve recorded content corresponding to the media content item after the media content item is recorded by one or more network recorders. The service office may also send request data to the network device. The request data may identify the media content item and the service office associated with the account identifier.

The method 400 may include receiving, at the network device of the media content distribution system, data indicating a media content item to be recorded, a number of requests to record the media content item received at service offices of the media content distribution system, and identifiers of one or more service offices that received requests to record the media content item, at 402. The data may include the request data received from the service offices. The data may include a number of requests to record the media content received at a first service office of the media content distribution system that is in a lowest tier of the media content distribution system that received requests for the media content item.

The network device may determine a threshold for the first service office, at 404. The threshold may be based on a first cost associated with storing the media content item in a memory associated with the first service office, based on a second cost of a first bandwidth delay product from a top tier of the media content distribution system to the first service office, based on a third cost of a second bandwidth delay product from the first service office to subscriber devices associated with the first service office and requests to record the media content item, based on a fourth cost of a third bandwidth delay product from a top tier of the media content distribution system to the subscriber devices.

The network device may determine whether the number of requests for the media content item attributed to the first service office is greater than or equal to the threshold, at 406. When the number of requests for the media content item attributed to the first service office is greater than or equal to the threshold, the network device may schedule recording of the media content item by a network recorder associated with the first service office, at 408. The network device may update the access database with an entry associated with a media content identifier of the media content item. The entry may be an identifier of the first service office. Scheduling the network recorder may include sending a request that identifies the media content item to a server associated with the first service office. At the scheduled time or at a different time if one or more previous programs went past scheduled end times, the server may initiate a virtual network recorder that stores a copy of the media content item to a memory device associated with the first service office. The virtual network recorder may update the access database with entries associated with the first service office. The entries may identify the memory device and a name of a file of the media content item at the memory device.

The network device may reduce the number of requests to record the media content item by the number of requests attributed to the first service office, at 410. The network device may determine whether the number of requests to record the media content item is zero, at 412. When the number of requests to record the media content item is zero, the method 400 may end, at 414. When the number of requests is not zero, the network device may identify a service office in a lowest tier of the media content distribution system associated with requests for the media content item as the first service office, at 416.

The network device may determine whether the first service office is a top tier service office, at 418. When the determination is that the first service office is not a top tier service office, the method 400 may then proceed to 404, where the network device determines a threshold for the first service office.

When the determination is that the first service office is a top tier service office, at 418, the network device may determine one or more service offices to store the media content associated with the requests attributed to the first service office, at 420. To determine the one or more service offices, the network device may determine viable options of service office combinations to store the media content item, may determine a cost associated with each viable option, and may determine a lowest cost option. The one or more service offices may be the service offices associated with the lowest cost option. The cost for a particular option may be a sum for each service office in the option of a storage cost associated with the service office, a cost of first bandwidth delay product from the first service office to the service office, and a cost of a second bandwidth delay product from the service office to subscriber devices associated with the service office that requested the media content item.

At each service office of the one or more service offices, the network device may schedule recording of the media content item by a network recorder associated with the service office, at 422. For each service office of the one or more service offices, the network device may update the access database with an entry associated with the media content identifier of the media content item, where the entry is an identifier of the service office. For each service office of the one or more service offices, scheduling a network recorder may include sending a request that identifies the media content item to a server associated with the service office. At the scheduled time or at a different time if one or more previous programs went past scheduled end times, the server may initiate a virtual network recorder that stores a copy of the media content item to a memory device associated with the service office. The virtual network recorder may update the access database with entries associated with the identifier of the service office. The entries may identify the memory device and a name of a file of the media content item at the memory device. The method 400 may then proceed to 410, where the network device reduces the number of requests to record the media content item by the number of requests attributed to the first service office.

When the determination at 406 is that the number of requests for the media content item attributed to the first service office is less than the threshold, the network device attributes the number of requests for the media content item to a particular service office that sends media content directly to the first service office, at 424. The method 400 may then continue to 416, where the network device may identify a service office in a lowest tier of the media content distribution system associated with unaccounted for requests for the media content item as the first service office.

Thus, the method 400 of FIG. 4 enables a network device of a media content delivery system to schedule recording of the media content by one or more network recorders associated with one or more service offices of the media content distribution system. The media content item may be scheduled to be recorded by a network recorded associated with a particular service office when a number of requests for the media content item attributed to the particular service office is greater than or equal to a threshold for the particular service office. The threshold may be determined based on a cost associated with storing the media content to a memory device associated with the service office, based on a cost associated with a first bandwidth delay product from a top tier of the media content distribution system to the particular service office, based on a cost of a second bandwidth delay product from the particular service office to particular subscriber devices to receive the media content via the particular service office, and based on a cost of a third bandwidth delay product from the top tier of the media content distribution system to the particular subscriber devices.

Figure 5:
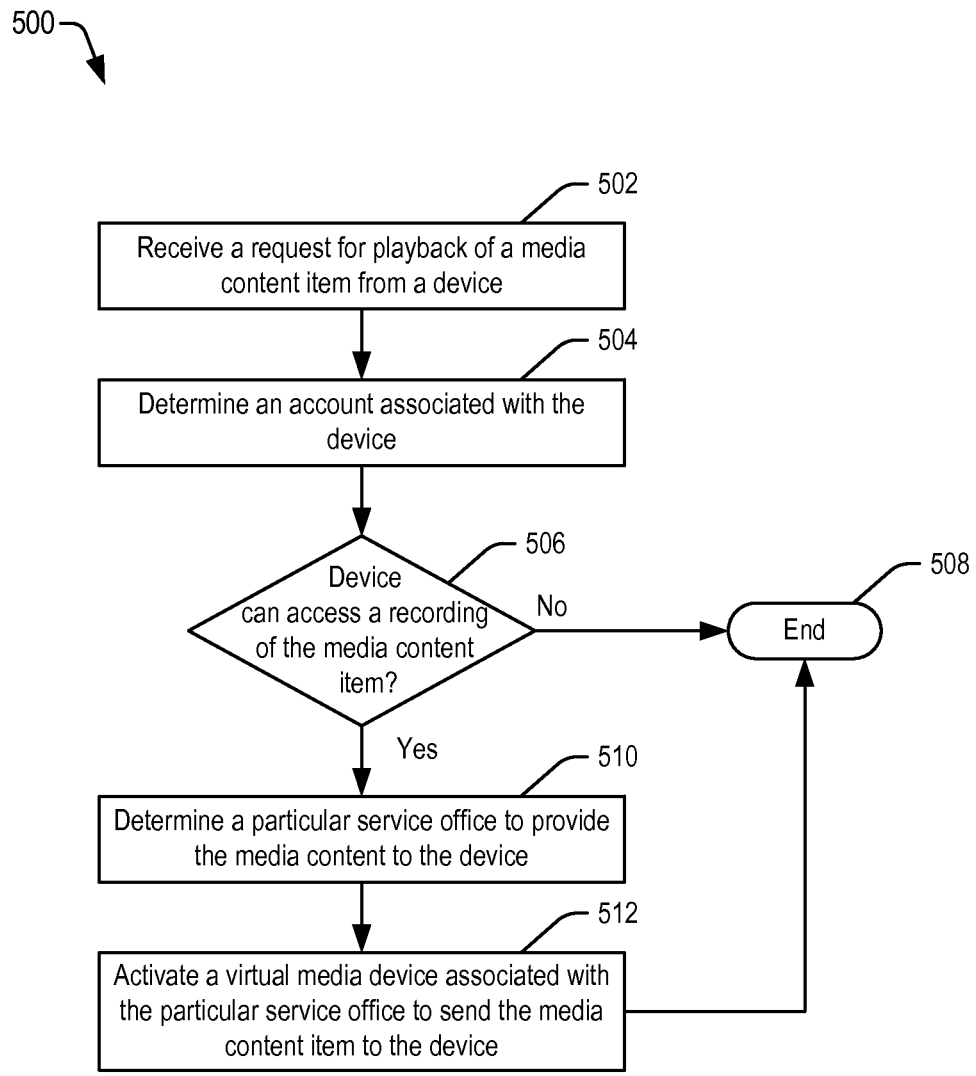
FIG. 5 is a flowchart of an embodiment of a method of retrieving recorded content corresponding to a media content item stored by a network recorder for playback by a device.

Referring to FIG. 5, a flowchart of a particular embodiment of a method 500 of retrieving recorded content corresponding to a media content item stored by a network recorder for playback by a device is shown. The device may be a subscriber device (e.g., a media device such as a set-top box device, desktop computer, laptop computer, tablet computer, mobile communication device, etc.). In an embodiment, a user of the device may start a program or application. The application or program may provide an interface that enables display of content recorded by at least one network device for an account associated with the device. The interface may organize display of recorded content by title, genre, actors, when recorded, other characteristic, or combinations thereof. Selection of desired content and entry of a playback command may cause the device to display a second interface. The second interface may display the recorded content and may enable the user to provide user input of commands to control display of the recorded content (e.g., play, pause, rewind, fast forward, stop, etc.).

The method 500 may be performed by a server of a first service office of a media content distribution system (e.g., one or service offices $SO_{i,1}$ 102 through $SO_{i,z}$ 102 of the media content distribution system 100 of FIG. 1) that receives a request to playback a media content item from the device. The server may receive the request for playback of the media content item from the device, at 502.

The server may determine an account identifier associated with the device, at 504. The account identifier may be retrieved from a subscriber database or may be determined based on an authentication process (e.g., entry of a username and password). The server may determine whether the device can access a recording of the media content item, at 506. The determination may be made by determining whether the account identifier is associated with a media content identifier of the media content item in an access database. When the account identifier is associated with the account identifier in the access database, devices associated with the account identifier may have an access right to a recording of the media content item. When the account identifier is not associated with the media content identifier in the access database, devices associated with the account identifier do not have rights to access a recording of the media content item.

A determination that the device cannot access the media content item may also be based on other factors such as service provider restrictions. A service provider restrictions may include not allowing simultaneous playback of the media content item to multiple devices associated with the account identifier (e.g., to more devices than a number of copies of the media content item associated with the account identifier as indicated in the access database). For example, the access database may include one entry of the account identifier associated with the media content identifier. Should a set-top box device associated with the account identifier request playback of the media content item when a tablet computer associated with the account identifier is already playing the media content item, the server may determine that the set-top box device cannot presently access a recording of the media content item. In some embodiments, an explanation message may be sent to the device when the server determines that the device cannot access a recording of the media content item. The explanation message may be a text message, e-mail message, pop-up message, or other type of message that provides a reason why the media content item is not available to a user of the device.

When the determination, at 506, is that the device cannot access a recording of the media content item, the method 500 ends, at 508. When the determination, at 506, is that the device can access a recording of the media content item, a particular service office to provide the media content to the device is determined, at 510. The server may query the access database based on an identifier of the media content item to determine whether the first service office associated with the server stores a copy of the media content item. When the first service office stores the copy of the media content item, the particular service office is the first service office. When the first service office does not store a copy of the media content item, the server may determine the particular service office by sending a request to a location server. The location server may determine the particular service office by determining, via the access database, one or more service offices that store a copy of the media content item and selecting a particular service office of the one or more service offices to stream the media content item to the device. The selection may be based on position in the media content distribution system of the particular service office and the first service office, communication loads between service offices, other factors, or combinations thereof. In some embodiments, the location server may have a copy of the media content item temporarily moved to the particular service office so that the particular service office can stream the media content item to the device.

A recorder service of the particular server office may generate a virtual network recorder to send the media content to the device, at 512. The virtual network recorder may stream the media content item to the device. When the media content item includes commercial advertisements, whether the commercial advertisements are presented may depend on a service level, a selection to receive the media content item without advertising, settings associated with an account or subscriber device, or combinations thereof. When the recorded content is not to include the commercial advertising, the network recorder may skip the advertising content based on locations of the advertising content indicated in the access database. When the media content item is to include commercial advertisements, the commercial advertisements may be one or more commercial advertisements originally recorded with the media content item, one or more replacement commercial advertisements, or combinations thereof. When the media content item is to include one or more replacement commercial advertisements, replacement may be based on advertising information included in the access database.

During playback of the media content item, a user of the device may enter commands via the user interface to control playback of the media content item. When playback is completed, the virtual network recorder may be terminated. The method 500 may end at 508.

Figure 6:
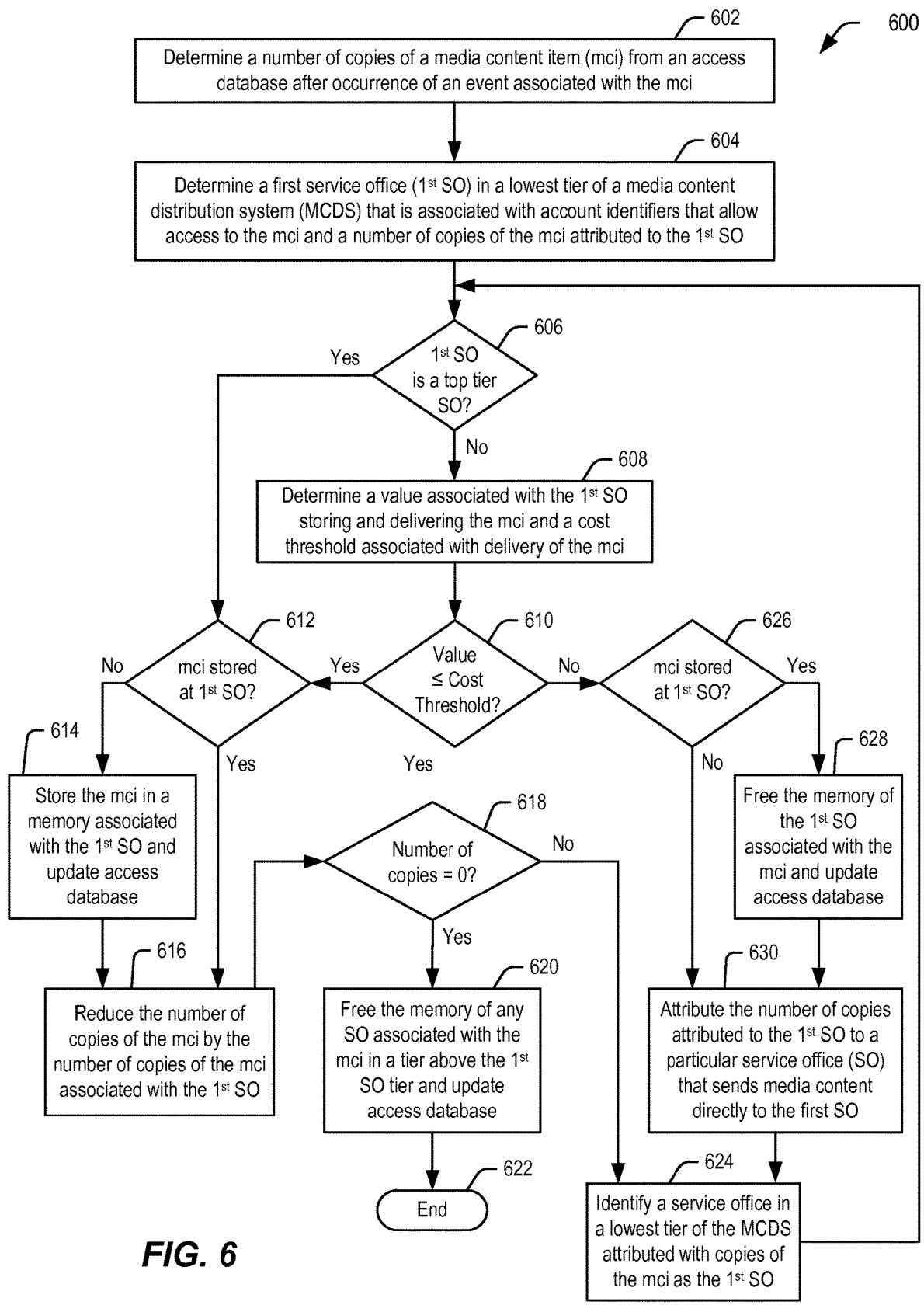
FIG. 6 is a flowchart of an embodiment of a method to enable redistribution of one or more copies of a media content item recorded by one or more network recorders of a media content distribution system.

Referring to FIG. 6, a flowchart of an embodiment of a method 600 to enable redistribution of one or more copies of a media content item recorded by one or more network recorders of a media content distribution system is shown. The method 600 may be performed by the network device 118 of the media content distribution system 100 of FIG. 1. The network device may determine a number of copies of the media content item from an access database after occurrence of an event associated with the media content item, at 602. The event may include passage of a particular amount of time since scheduled presentation of the media content item via the media content distribution system (e.g., one week, one month, 6 months, 1, year, other times, or combinations thereof) or may be an addition of one or more account identifiers associated with the media content item in an access database after the media content item was recorded (e.g., requests for recording of subsequent presentations of the media content item (i.e., reruns) were received and account identifiers associated with the requests were associated with an identifier of the media content item instead of storing the subsequent presentations). During the particular amount of time, an association of one or more account identifiers with a media content identifier associated with the media content item may be deleted automatically or by request of subscribers. Deletion or addition of account associations to the media content identifier may justify redistributing storage of the media content item in the media content distribution system.

The network device may determine a first service office in a lowest tier of the media content distribution system that is associated with account identifiers that allow access to the media content item and a number of copies of the media content item attributed to the first service office, at 604. The network device may determine the first service office using the access database to determine account identifiers associated with the media content item, using a subscriber database to determine service offices associated with the account identifiers, and selecting a particular service office in a lowest tier of the media content distribution system associated with at least one copy of the media content item as the first service office.

The network device may determine whether the first service office is a top tier service office of the media content distribution system, at 606. When the first service office is not a top tier service office, the network device may determine a value associated with the first service office storing and delivering the media content item and a cost threshold associated with delivery of the media content item, at 608. The value may be based on a storage cost associated with storing the media content item in a memory device associated with the first service office, based on a cost of a first bandwidth delay product from a top tier of the media content distribution system to the first service office, based on a cost of a second bandwidth delay product from the first service office to customer devices, or based on combinations thereof. The cost threshold may be based on a number of requests attributed to the first service office and a cost of a bandwidth delay product from a top tier of the media content distribution system to customer devices associated with the requests.

The network device may then determine whether the value is less than or equal to the cost threshold, at 610. When the value is less than or equal to the cost threshold, the network device may determine whether the media content item is stored at the first service office, at 612.

When the media content item is not stored at the first service office, at 612, the network device may cause the media content item to be stored in at a memory device associated with the first service office, and may update the access database, at 614. Causing the media content item to be stored at the memory device may include determining a particular service office that stores the media content item and copying the media content item to the memory device. The particular service office may be a memory device that sends media content to the first service office or that sends media content to the first service office. Updating the access database may include adding an entry that associates the first service office with the media content item, an entry that identifies the memory device, and an entry of a file name of the media content item stored at the memory device. The method 600 may then reduce the number of copies of the media content item by the number of copies of the media content item attributed to the first service office, at 616. When the media content item is stored at the first service office, at 612, the network device may reduce the number of copies of the media content item by the number of copies of the media content item attributed to the first service office, at 616.

The method 600 may then proceed to 618. The network device may determine whether the number of copies is zero, at 618. When the number of copies is zero, the network device may free memory associated with the media content item of any service office in a tier above a tier that includes the first service office and may update the access database, at 620. Freeing the memory associated with a particular service office may include sending a delete command to a memory device of the particular service office that identifies the file name of the media content item. Updating the access database for the particular service office may include removing an entry that associates the particular service office with the media content item, removing an entry that identifies the memory device, and removing an entry of the file name of the media content item. The method 600 may end, at 622.

When the determination is that the number of copies is not zero, at 618, the network device may identify a service office in a lowest tier of the media content distribution system attributed with copies of the media content item as the first service office, at 624. The method 600 may then proceed to 606, where the network device determines whether the first service office is a top tier service office.

When the determination is that the value is greater than the cost threshold, at 610, the network device may determine whether the media content item is stored at the first service office, at 626. When the determination is that the media content item is stored at the first service office, the network device may free the memory of the first service office associated with the media content item and update the access database, at 628. Freeing the memory associated with the first service office may include sending a delete command to the first service office that identifies a memory device at the first service office that stores the media content item and a file name of the media content item stored at the memory device. Updating the access database may include removing an entry associated with the first service office, removing an entry identifying the memory device, an entry of the file name of the media content item at the memory device, and removing an association of the first service office with the media content item. The network device may attribute the number of copies of the media content item attributed to the first service office to a particular service office that sends media content directly to the first service office, at 630. When the determination is that the media content item is not stored at the first service office, at 626, the network device may attribute the number of copies of the media content item attributed to the first service office to a particular service office that sends media content directly to the first service office, at 630.

The method 600 may then proceed to 624. The network device may identify a service office in a lowest tier of the media content distribution system attributed with copies of the media content item as the first service office, at 624.

When the determination is that the first service office is a top tier service office, at 606, the network device may proceed to 612. The network device may determine whether the media content item is stored at the first service office, at 612. The method 600 may then continue as described above.

Thus, the method 600 of FIG. 6 enables redistribution of storage locations of media content stored by network recorders to accommodate changes in access rights of subscribers to the media content item. The ability to redistribute the storage locations may enable a balance between costs associated with storing the media content item and costs associated with delivering the media content items to particular subscriber devices.

Various embodiments disclosed herein describe determining a service office of a media content distribution system to record media content with a network recorder. Requests to record the media content item may be received from subscriber devices. One or more service offices to record the media content item may be determined based on balancing costs associated with storing the media content item and costs associated with delivering the media content item. Use of network recorders may eliminate a need for residential digital video recorders or reduce storage capacity needed for residential digital video recorders. Distribution of the media content item among the service offices may be changed based on storage costs and delivery costs to accommodate additional access to the media content item (e.g., due to recording of reruns of the media content item) or less access to the media content item (e.g., due to deletion of associations to the media content item). Storing recorded media content at particular service offices, redistributing storage locations, or both, based on storage costs and delivery costs may efficiently utilize network resources and minimize costs to a service provider associated with providing recorded content to subscribers.

Figure 7:
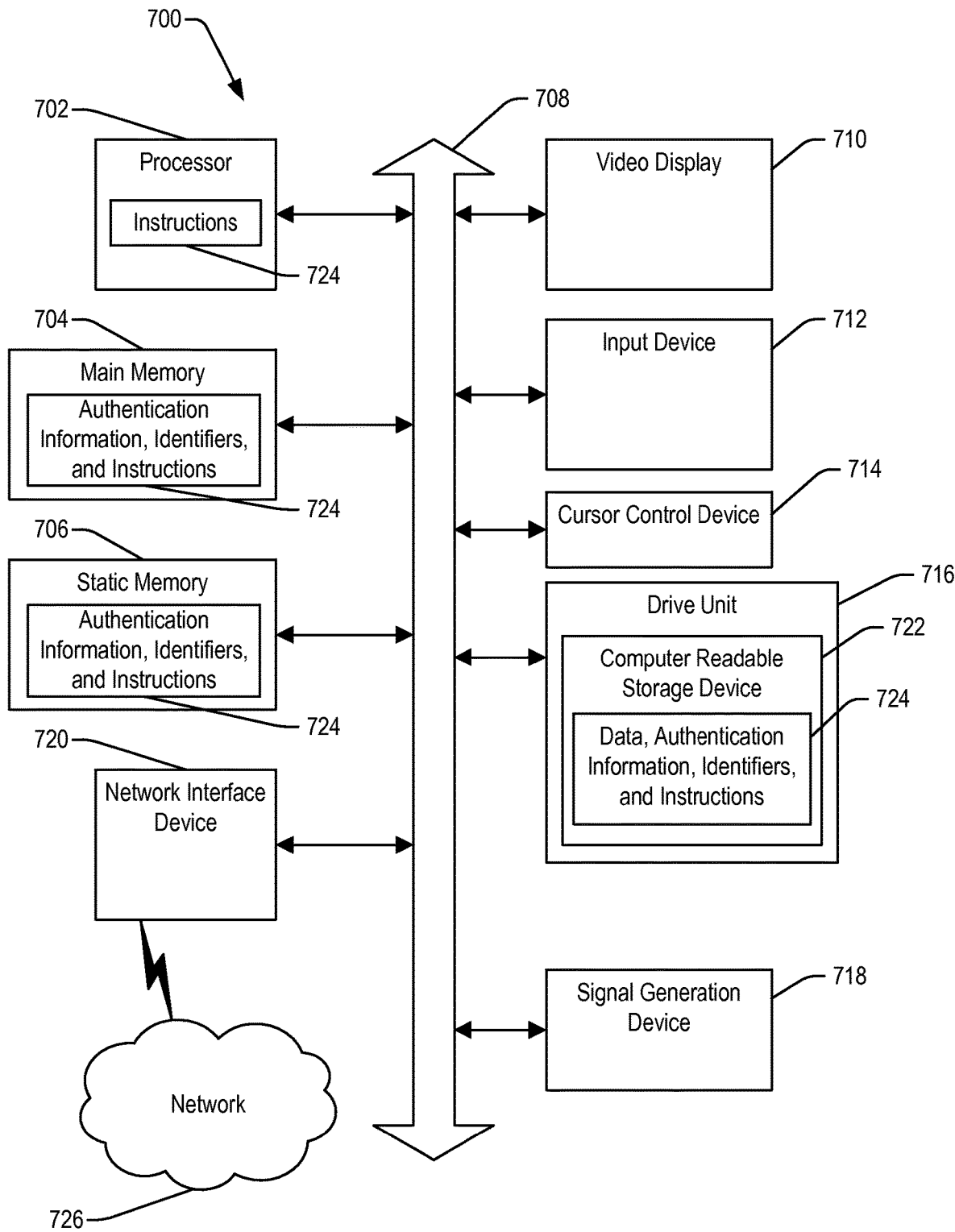
FIG. 7 is a block diagram of an illustrative embodiment of a general computer system.

Referring to FIG. 7, an illustrative embodiment of a general computer system is shown and is designated 700. The computer system 700 includes a set of instructions (e.g., the instructions 724 in the memory 704) that can be executed to cause the computer system 700 to perform any one or more of the methods or computer based functions disclosed herein. The computer system 700 may operate as a stand-alone device or may be connected (e.g., using a network) to other computer systems or peripheral devices. For example, the computer system 700 may include or may be included within any one or more of the service offices 102, content providers 104, access points 106, subscriber devices 108, servers 112, subscriber database 114, access database 116, network device 118, or combinations thereof described with reference to FIG. 1.

In a networked deployment, the computer system 700 may operate in the capacity of a server or as a client user computer in a server-client user network environment, or as a peer computer system in a peer-to-peer (or distributed) network environment. The computer system 700 may also be implemented as or incorporated into various devices, such as a server, a network device, a mobile device, a palmtop computer, a laptop computer, a desktop computer, a communications device, a wireless telephone, a personal computer (PC), a tablet PC, a personal digital assistant (PDA), a set-top box (STB) device, a customer premises equipment device, an endpoint device, a web appliance, or any other machine capable of executing a set of instructions (sequential or otherwise) that specify actions to be taken by that machine. In a particular embodiment, the computer system 700 may be implemented using electronic devices that provide video, audio, data communication, or combinations thereof. Further, while a single computer system 700 is illustrated, the term "system" shall also be taken to include any collection of systems or sub-systems that individually or jointly execute a set, or multiple sets, of instructions to perform one or more computer functions.

As illustrated in FIG. 7, the computer system 700 may include a processor 702 (e.g., a central processing unit (CPU), a graphics processing unit (GPU), or both). Moreover, the computer system 700 may include a main memory 704 and a static memory 706, which can communicate with each other via a bus 708. As shown, the computer system 700 may further include a video display unit 710, such as a liquid crystal display (LCD), a light emitting diode (LED) display, a touch screen display, a flat panel display, a solid state display, or a lamp assembly of a projection system. Additionally, the computer system 700 may include an input device 712, such as a remote control device (e.g., a television remote or a set-top box remote), a keyboard, a joystick, another type of input device, or combinations thereof. In addition, the computer system 700 may include a cursor control device 714 (e.g., a mouse). In some embodiments, the input device 712 and the cursor control device 714 may be integrated into a single device, such as a capacitive touch screen input device. The computer system 700 may also include a drive unit 716, a signal generation device 718, such as a speaker or remote control, and a network interface device 720. Some computer systems 700 may not include an input device (e.g., a server may not include an input device).

In a particular embodiment, as depicted in FIG. 7, the drive unit 716 may include a computer-readable storage device 722 in which authentication information, identifiers, and one or more sets of instructions 724, e.g. software, can be embedded. The computer-readable storage device 722 may be random access memory (RAM), read-only memory (ROM), programmable read-only memory (PROM), erasable PROM (EPROM), electrically erasable PROM (EEPROM), one or more registers, solid-state memory, one or more hard disks, one or more removable disks, compact disc read-only memory (CD-ROM), other optical disk storage, magnetic disk storage, magnetic storage devices, or any other storage device usable to store program code in the form of instructions or data and that can be accessed by a computer and/or a processor. A computer-readable storage device is not a signal.

Further, the instructions 724 may embody one or more of the methods or logic as described herein. The instructions 724 may be executable by the processor 702 to perform one or more functions or methods described herein, such as the methods 200, 300, 400, 500, and 600 described with reference to FIGS. 2-6, respectively. In a particular embodiment, data (e.g., information corresponding to a media content item), authentication information, identifiers, and instructions (e.g., instructions to generate virtual network recorders) 724 may reside completely, or at least partially, within the main memory 704, the static memory 706, and/or within the processor 702 during execution by the computer system 700. The main memory 704 and the processor 702 also may include a computer-readable storage device. The authentication information included in the authentication information, identifiers, and instructions 724 in the drive unit 716, the main memory 704, the static memory 706, the processor 702, or combinations thereof may be transmitted to another computer system to enable authentication of the computer system 700, and the identifiers may include a list of identifiers used to authenticate the other computer system, prior to sharing a resource with the other computer system.

In an alternative embodiment, dedicated hardware implementations, such as application specific integrated circuits, programmable logic arrays and other hardware devices, may be constructed to implement one or more of the methods described herein. Various embodiments may include a variety of electronic and computer systems. One or more embodiments described herein may implement functions using two or more specific interconnected hardware modules or devices with related control and data signals that can be communicated between and through the modules, or as portions of an application-specific integrated circuit (ASIC). Accordingly, the present system encompasses software, firmware, and hardware implementations.

In accordance with various embodiments of the present disclosure, the methods described herein may be implemented by software programs executable by a computer system, a processor, or a device, which may include forms of instructions embodied as a state machine implemented with logic components in an ASIC or a field programmable gate array (FPGA) device. Further, in an exemplary, non-limiting embodiment, implementations may include distributed processing, component/object distributed processing, and parallel processing. Alternatively, virtual computer system processing may be constructed to implement one or more of the methods or functionality described herein. It is further noted that a computing device, such as a processor, a controller, a state machine or other suitable device for executing instructions to perform operations may perform such operations directly or indirectly by way of one or more intermediate devices directed by the computing device.

The computer system 700 may communicate with one or more external systems via a network 726. First data stored by the computer-readable storage device 722 may be sent to the one or more external systems via the network 726. Also, second data may be received by the computer system 700 via the network 726. The second data may be stored by the processor 724 to the computer-readable storage device. Additionally, while the computer-readable storage device 722 is shown to be a single device, the computer-readable storage device 722 may be a single device or may be multiple devices, such as a centralized or distributed database, and/or associated caches and servers that store one or more sets of instructions. The computer-readable storage device 722 is capable of storing a set of instructions for execution by the processor 702 to cause the computer system 700 to perform any one or more of the methods or operations disclosed herein.

In a particular non-limiting, exemplary embodiment, the computer-readable storage device 722 may include a solid-state memory such as embedded memory (or a memory card or other package that houses one or more non-volatile read-only memories). Further, the computer-readable storage device 722 may include a random access memory or other volatile re-writable memory. Additionally, the computer-readable storage device 722 may include a magneto-optical or optical device, such as a disk or tapes or other storage device. Accordingly, the disclosure is considered to include any one or more of a computer-readable storage device and other equivalents and successor devices, in which data or instructions may be stored.

Although the one or more components and functions may be described herein as being implemented with reference to particular standards or protocols, the disclosure is not limited to such standards and protocols. Such standards are from time-to-time superseded by faster or more efficient equivalents having essentially the same functions. Wireless standards for short-range communications and long-range communications can be used by the computer system 700 in selected embodiments.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Figures are also merely representational and may not be drawn to scale. Accordingly, the disclosure and the figures are to be regarded as illustrative rather than restrictive.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order unless expressly stated. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be implemented as multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, an application specific integrated circuit, and/or a programmable gate array (PGA) including a FPGA. In one or more embodiments, when a processor executes instructions to perform "operations", this can include the processor performing the operations directly and/or facilitating, directing, or cooperating with another device or component to perform the operations.

The Abstract is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method comprising:

receiving, at a network device of a media content distribution system from a requesting device, a request to record a media content item, the request including an identifier of the media content item and an identifier of the requesting device, the media content distribution system including multiple tiers of service offices with overlapping delivery areas;

determining, based on the identifier of the requesting device, a first service office of the media content distribution system that is associated with the requesting device, wherein the determining the first service office is based on identifying a lowest tier of the multiple tiers of the media content distribution system having a service office with a non-zero count of requests to record the media content item, wherein the first service office is selected based on being in the determined lowest tier;

incrementing, at the network device based on the request, a total count of requests to record the media content item and a count of requests to record the media content item attributed to the first service office;

making a determination, based on a first selection criteria, whether to record the media content item at the first service office, wherein the first selection criteria comprises a first storage cost, a first bandwidth delay between a top tier and the first service office, and a second bandwidth delay between the first service office and first requesting devices;

responsive to the determination indicating to record the media content item at the first service office:

sending a command from the network device to the first service office to schedule recording of the media content item by a first network recorder at a scheduled time associated with the media content item; and adjusting, at the network device, the total count by subtracting the count of requests to record the media content item attributed to the first service office;

in response to the adjusting of the total count, determining to additionally record the media content item at a second network recorder of a second service office of the media content distribution system based on the total count being greater than zero after the adjusting of the total count;

determining a lowest tier of the multiple tiers of the media content distribution system having the second service office with a non-zero count of requests to record the media content item; and selecting the second network recorder of the second service office in the determined lowest tier based on a second selection criteria that comprises a second storage cost, a third bandwidth delay between the top tier and the second service office, and a fourth bandwidth delay between the second service office and second requesting devices, wherein the first and second service offices are in an intermediate tier that is above a bottom tier of the multiple tiers.

2. The method of claim 1, wherein the multiple tiers include national, regional and local tiers.

3. The method of claim 2, wherein an intermediate tier service office in the intermediate tier is configured to provide media content to access points.

4. The method of claim 3, wherein the access points include at least one of a residential gateway or a base stations associated with a mobile communication network.

5. The method of claim 3, wherein the first network recorder is a virtual network recorder that streams the media content item to the requesting device.

6. The method of claim 2, wherein a top tier service office in the top tier is configured to provide media content to an intermediate tier service office in the intermediate tier and directly to access points.

7. The method of claim 1, wherein the first network recorder removes advertising in the media content item according to a service level of a subscriber associated with the requesting device or a selection by the subscriber.

8. The method of claim 1, wherein the first network recorder replaces first advertising in the media content item with second advertising according to advertising information stored in an access database.

9. The method claim 8, wherein replacing the first advertising with the second advertising is based on a determination that an event associated with the first advertising has already occurred.

10. The method of claim 1, wherein the network device receives request data for the media content item from devices associated with subscriber requests for the media content item.

11. A system comprising:
a processor; and
a memory coupled to the processor, the memory comprising instructions executable by the processor to perform operations, the operations including:
receiving data indicating a media content item to be recorded, the data indicating service offices of a media content distribution system associated with requests to record the media content item, the media content distribution system including multiple tiers of service offices with overlapping delivery areas;
storing, based on the data, a total number of requests to record the media content item and a number of requests to record the media content item associated with each service office of the service offices;
at a particular time before a scheduled presentation time for the media content item, identifying a lowest tier of the multiple tiers of the media content distribution system associated with a non-zero number of requests to record the media content item and identifying a first service office in the lowest tier;
making a determination, based on a first selection criteria, to record the media content item at the first service office, wherein the first selection criteria comprises a first storage cost, a first bandwidth delay between a top tier and the first service office, and a second bandwidth delay between the first service office and first requesting devices;
responsive to the determination indicating to record the media content item at the first service office:
sending a command to the first service office to record the media content item by a first network recorder at the scheduled presentation time;
adjusting the total number of requests by subtracting the number of requests associated with the first service office; and
responsive to the adjusting of the total number of requests, determining to additionally record the media content item at a second network recorder of a second service office of the media content distribution system based on the total number of requests being greater than zero after the adjusting of the total number of requests;
determining a lowest tier of the multiple tiers of the media content distribution system having the second service office with a non-zero count of requests to record the media content item; and
selecting the second network recorder of the second service office in the determined lowest tier based on a second selection criteria that comprises a second storage cost, a third bandwidth delay between the top tier and the second service office, and a fourth bandwidth delay between the second service office and second requesting devices.

12. The system of claim 11, wherein the first and second service offices are in an intermediate tier that is above a bottom tier of the multiple tiers and wherein the operations further include,
after passage of a period of time from the scheduled presentation time:
determining a remaining number of accounts authorized to retrieve a recording of the media content item based on the requests to record the media content item;
making a determination whether to adjust a storage location of the media content item based on the remaining number of accounts; and
adjusting the storage location of the media content item based on the determination indicating to adjust the storage location.

13. The system of claim 11, wherein a first portion of the data is received from the first service office, wherein the first portion indicates a request of the requests to record the media content item, the request sent from a user device to the first service office, and wherein the first portion of the data indicates that the request is associated with the first service office.

14. The system claim 11, wherein a first portion of the data is received from the second service office, wherein the first portion indicates a request of the requests to record the media content item, the request sent from a user device to the second service office, and wherein the first portion of the data indicates that the request is associated with a third service office.

15. A computer-readable storage device storing instructions executable by a processor to perform operations, the operations comprising:
receiving data indicating a media content item to be recorded, the data indicating service offices of a media content distribution system associated with requests to record the media content item, the media content distribution system including multiple tiers of service offices with overlapping delivery areas;
storing, based on the data, a total number of requests to record the media content item and a number of requests to record the media content item associated with each service office of the service offices;
at a particular time before a scheduled presentation time for the media content item, identifying a lowest tier of the multiple tiers of the media content distributions system associated with a non-zero number of requests to record the media content item and identifying a first service office in the lowest tier;

making a determination, based on a first selection criteria, to record the media content item at the first service office, wherein the first selection criteria comprises a first storage cost, a first bandwidth delay between a top tier and the first service office, and a second bandwidth delay between the first service office and first requesting devices;

responsive to the determination indicating to record the media content item at the first service office:
  sending a command to the first service office to record the media content item by a first network recorder at the scheduled presentation time;
  adjusting the total number of requests by subtracting the number of requests associated with the first service office; and responsive to the adjusting of the total number of requests, determining to additionally record the media content item at a second network recorder of a second service office of the media content distribution system based on the total number of requests being greater than zero after the adjusting of the total number of requests;

determining a lowest tier of the multiple tiers of the media content distribution system having the second service office with a non-zero count of requests to record the media content item; and selecting the second network recorder of the second service office in the determined lowest tier based on a second selection criteria that comprises a second storage cost, a third bandwidth delay between the top tier and the second service office, and a fourth bandwidth delay between the second service office and second requesting devices.

16. The computer-readable storage device of claim 15, wherein the operations further comprise, adding the number of requests associated with the first service office to a number of requests associated with a particular service office in a next higher tier of the media content distribution system that sends media content to the first service office.

17. The computer-readable storage device of claim 15, wherein the first network recorder removes advertising in the media content item according to a service level of a subscriber associated with the requesting device or a selection by the subscriber.

18. The computer-readable storage device of claim 15, wherein the first and second service offices are in an intermediate tier that is above a bottom tier of the multiple tiers, and wherein the determining to additionally record the media content item at the second network recorder of the second service office is based in part on a second determination that the second service office is not in the top tier of the media content distribution system and wherein the operations further comprise:
  sending a second command to the second service office to schedule recording of the media content item at the scheduled presentation time;
  further adjusting the total number of requests by subtracting the number of requests to record the media content item associated with the second service office; and
  in response to the adjusting of the total number of requests, determining whether to additionally record the media content item at another service office of the media content distribution system based on the total number of requests being greater than zero after the further adjusting of the total number of requests.

19. The computer-readable storage device of claim 15, wherein the first network recorder replaces first advertising in the media content item with second advertising according to advertising information stored in an access database.

20. The computer-readable storage device of claim 19, wherein replacing the first advertising with the second advertising is based on a determination that an event associated with the first advertising has already occurred.

* * * * *

UNITED STATES PATENT AND TRADEMARK OFFICE
CERTIFICATE OF CORRECTION

| | | |
|---|---|---|
| PATENT NO. | : 10,715,837 B2 | Page 1 of 1 |
| APPLICATION NO. | : 14/657426 | |
| DATED | : July 14, 2020 | |
| INVENTOR(S) | : James A. Gardner | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 154 days.

Signed and Sealed this
Thirteenth Day of December, 2022

*Katherine Kelly Vidal*

Katherine Kelly Vidal
*Director of the United States Patent and Trademark Office*